US012260684B2

(12) United States Patent
Park et al.

(10) Patent No.: US 12,260,684 B2
(45) Date of Patent: Mar. 25, 2025

(54) METHOD AND SYSTEM FOR RECORDING AND MANAGING VEHICLE-GENERATED DATA

(71) Applicants: Hyundai Motor Company, Seoul (KR); Kia Corporation, Seoul (KR)

(72) Inventors: Seung Wook Park, Yongin-si (KR); Wha Pyeong Lim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 307 days.

(21) Appl. No.: 17/912,405

(22) PCT Filed: Mar. 11, 2021

(86) PCT No.: PCT/KR2021/002999

§ 371 (c)(1), (2) Date: Sep. 16, 2022

(87) PCT Pub. No.: WO2021/187802

PCT Pub. Date: Sep. 23, 2021

(65) Prior Publication Data

US 2023/0145574 A1 May 11, 2023

(30) Foreign Application Priority Data

Mar. 19, 2020 (KR) ........................ 10-2020-0033526
Mar. 10, 2021 (KR) ........................ 10-2021-0031545

(51) Int. Cl.

*G06F 16/11* (2019.01)
*G07C 5/00* (2006.01)
*G07C 5/08* (2006.01)

(52) U.S. Cl.

CPC ............. *G07C 5/008* (2013.01); *G07C 5/085* (2013.01)

(58) Field of Classification Search

CPC .......... G06F 16/11; G06F 16/16; G06F 12/00; G07C 5/08; G07C 5/00; G07C 5/02

See application file for complete search history.

(56) References Cited

U.S. PATENT DOCUMENTS 8,321,086 B2 11/2012 Park et al.
8,798,854 B2 * 8/2014 Sakakibara ............ G07C 5/085 701/33.5

(Continued)

FOREIGN PATENT DOCUMENTS

JP H10133929 A 5/1998
KR 20100083024 A 7/2010

(Continued)

*Primary Examiner* — Tan Q Nguyen
(74) *Attorney, Agent, or Firm* — Slater Matsil, LLP

(57) ABSTRACT

An embodiment vehicle system includes a telecommunication device that enables communication between a vehicle and a remote server, a first data recorder configured to store, in a first internal storage, a plurality of interaction data indicating timestamped interactions that occur between an autonomous driving system of the vehicle and a driver while driving and configured to protect main interaction data of the plurality of interaction data that is stored proximate to a point in time of an occurrence of a predefined event from being overwritten with new interaction data without first being uploaded to the remote server, and a second data recorder configured to store, in a second internal storage, event data indicating a state of the vehicle for a predetermined time before and after the event occurs.

20 Claims, 5 Drawing Sheets

(56) References Cited

U.S. PATENT DOCUMENTS

| | | | | |
|---|---|---|---|---|
| 2007/0132773 | A1* | 6/2007 | Plante | G07C 5/0891<br>345/564 |
| 2009/0319119 | A1* | 12/2009 | Park | G07C 5/085<br>701/31.4 |
| 2010/0019892 | A1* | 1/2010 | Roh | B60R 21/0134<br>340/439 |
| 2017/0021835 | A1 | 1/2017 | Kojima | |

FOREIGN PATENT DOCUMENTS

| | | | |
|---|---|---|---|
| KR | 101088944 | B1 | 12/2011 |
| KR | 101094213 | B1 | 12/2011 |

* cited by examiner

METHOD AND SYSTEM FOR RECORDING AND MANAGING VEHICLE-GENERATED DATA

CROSS-REFERENCE TO RELATED APPLICATIONS

This application is a national stage application of International Application No. PCT/KR2021/002999, filed on Mar. 11, 2021, which claims priority to Korean Patent Application No. 10-2020-0033526, filed on Mar. 19, 2020, and Korean Patent Application No. 10-2021-0031545, filed on Mar. 10, 2021, which applications are hereby incorporated herein by reference.

TECHNICAL FIELD

The present disclosure relates to a data recorder for recording data generated by a vehicle.

BACKGROUND

The statements in this section merely provide background information related to the present disclosure and do not necessarily constitute prior art.

An event data recorder (EDR) is configured to detect an accident or such event and store information about a driving state of a vehicle or an operation by a driver within a predetermined time before and after the event. At least several parameters, including speed, seat belt status, and airbag deployment status, are stored for reconstruction during forensic investigations.

Forensic investigation is generally performed using a vehicle diagnostic link connector, e.g., an on-board computer (OBD)-II port or by physically extracting an EDR data memory and reading data therefrom. Data in the EDR is susceptible to damage or alteration due to faulty reading technology and may be maliciously manipulated or deleted after storing, which exhibits the difficulty of ensuring complete data integrity for the stored data.

As the application of ADAS (Advanced Driver Assistance Systems) or autonomous driving functions expands, identifying who was controlling a vehicle between an autonomous driving system and a driver at a point in time of an accident may be useful for proper investigation of the cause of the accident.

SUMMARY

Embodiments of the disclosure present techniques for identifying and protecting interaction data recorded proximate to a point in time of occurrence of an event, which can be usefully used in a vehicle system including a first data recorder that records a plurality of interaction data indicating timestamped interactions that occur between an autonomous driving system of a vehicle and a driver while driving, and a second data recorder that records event data indicating the state of the vehicle for a predetermined time before and after the event such as a collision accident occurs.

In accordance with one embodiment of the present disclosure, a vehicle system comprises a telecommunication device that enables communication between a vehicle and a remote server. The vehicle system further comprises a first data recorder that stores, in a first internal storage, a plurality of interaction data indicating timestamped interactions that occur between an autonomous driving system of the vehicle and a driver while driving. The vehicle system further comprises a second data recorder that stores, in a second internal storage, event data indicating a state of the vehicle for a predetermined time before and after a predefined event occurs. The first data recorder is configured to protect at least one interaction data (hereinafter referred to as "main interaction data") stored proximate to a point in time of an occurrence of the event from being overwritten with new interaction data without being uploaded to the remote server.

Various embodiments of the vehicle system may include one or more of the following features.

In some embodiments, when storing the new interaction data in the first internal storage, the first data recorder may be configured to set a lock flag of the new interaction data as a first value and change the lock flag of the main interaction data to a second value.

In some embodiments, the second data recorder may be configured to transmit a locking request signal to the first data recorder in response to the occurrence of the event, so that the first data recorder is able to specify the main interaction data among the plurality of interaction data.

In some embodiments, the first data recorder may be configured to change the lock flag of recent interaction data stored for a predetermined period before a point in time when the locking request signal is received to a second value in response to the locking request signal.

In some embodiments, the first data recorder may be configured to change the lock flag of a predefined number of recent interaction data stored before a point in time when the locking request signal is received to a second value in response to the locking request signal.

In some embodiments, the first data recorder and the second data recorder may be configured to upload, via the communication device, the plurality of interaction data stored in the first internal storage and the event data stored in the second internal storage, respectively, to the remote server. The first data recorder may be configured to delete related interaction data from the first internal storage when an upload to the remote server is successful.

In some embodiments, the first data recorder may be configured to upload the main interaction data to the remote server preferentially among the plurality of interaction data stored in the first internal storage.

In some embodiments, the first data recorder may be configured to upload the plurality of interaction data stored in the first internal storage to the remote server whenever the ignition of the vehicle enters an ON state.

In some embodiments, the first data recorder may be configured to upload the plurality of interaction data stored in the first internal storage to the remote server after a waiting time calculated based on a random number elapses from a point in time when the ignition of the vehicle enters an ON state.

In accordance with one embodiment of the present disclosure, a method performed by a vehicle system comprising a first data recorder and a second data recorder is presented. The method comprises storing, by the first data recorder, in a first internal storage, a plurality of interaction data indicating timestamped interactions that occur between an autonomous driving system of a vehicle and a driver while driving. The method further comprises storing, by the second data recorder, in a second internal storage, event data indicating a state of the vehicle for a predetermined time before and after a predefined event occurs. The method further comprises identifying, by the first data recorder, at least one interaction data (hereinafter referred to as "main interaction data") stored proximate to a point in time of an occurrence of the event. The method further comprises changing, by the first data recorder, a value of a lock flag of the identified main interaction data to protect the main interaction data from being overwritten with new interaction data without being uploaded to a remote server.

According to the techniques of embodiments of the present disclosure, it is possible to protect interaction data recorded proximate to a point in time of the occurrence of an event such as a collision accident from being overwritten with new interaction data without being uploaded to a remote server. In addition, some techniques of embodiments of the present disclosure may increase the likelihood that the interaction data recorded proximate to a point in time of a collision will be successfully uploaded to the remote server.

DETAILED DESCRIPTION OF ILLUSTRATIVE EMBODIMENTS

Figure 1:
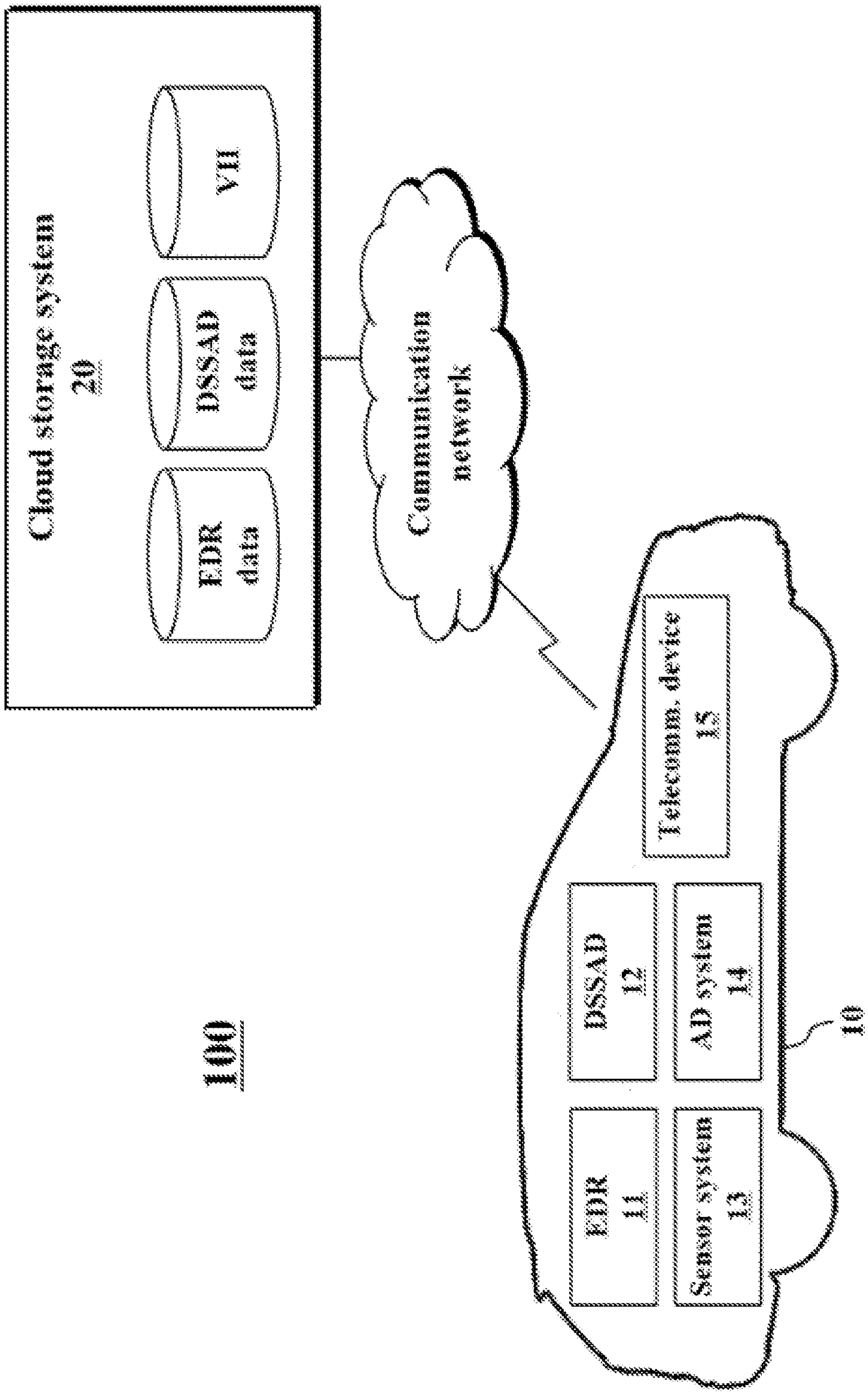
FIG. 1 is a conceptual diagram illustrating an example of a centralized system for collecting and managing vehicle-generated data from vehicles, in which the techniques of embodiments of the present disclosure may be used.

Hereinafter, some embodiments of the present disclosure will be described in detail with reference to the accompanying drawings. In the following description, like reference numerals designate like elements, although the elements are shown in different drawings. Further, in the following description of some embodiments, a detailed description of known functions and configurations incorporated therein will be omitted for the purpose of clarity and for brevity.

FIG. 1 is a conceptual diagram illustrating an example of a centralized system for collecting and managing vehicle-generated data from vehicles, in which the techniques of embodiments of the present disclosure may be used.

A system 100 includes an in-vehicle data recording system 10 provided in a vehicle, and a cloud storage system 20 implemented as server(s) on a network. The server(s) implementing the cloud storage system 20 may be server(s) operated by a vehicle manufacturer or server(s) operated by an operator who is independent of the vehicle manufacturers, or may include a combination thereof.

A vehicle is configured to operate fully or partially in an autonomous driving mode and may therefore be referred to as an "autonomous driving vehicle." For example, an autonomous driving system 14 may receive information from a sensor system 13 and execute, in an automated manner, one or more control processes based on the received information (for example, setting steering to avoid detected obstacles).

A vehicle may be fully autonomous or partially autonomous. In a partially autonomous vehicle, some functions may be temporarily or continuously controlled manually by a driver. Further, the fully autonomous vehicle may be configured to be switchable between a fully manual operating mode and a partially autonomous operating and/or fully autonomous operating mode.

The in-vehicle data recording system 10 may be configured to generate, record, or store various types of data related to vehicle operation or driver behavior. The in-vehicle data recording system 10 includes two types of data recorders: an Event Data Recorder (EDR) 11 and a Data Storage System for Automated Driving Vehicles (DSSAD) 12. They record vehicle-generated data for different purposes.

The purpose of the EDR 11 is to store vehicle information for specific events such as airbag deployment. Data from the EDR 11 is used for collision analysis and reconstruction. The purpose of the DSSAD 12 is to record all predefined interactions between a driver and an autonomous driving system. Data from the DSSAD 12, typically stored in timestamp format, is used to identify a subject who was controlling a vehicle at a particular point in time. The data of the EDR 11 and the data of the DSSAD 12 are used complementary to each other in forensic investigations, and in particular, the data of the DSSAD 12 is useful for identifying a subject who was controlling the vehicle at the time of collision.

The EDR 11 may be configured to receive data from various sensors and/or electronic control units (ECUs) mounted on the vehicle. The EDR 11 has a buffer (or a volatile memory) of the EDR 11 that has data for a certain period temporarily stored while being continuously updated. The EDR 11 may be responsive to a detection of the occurrence of one or more predefined events for recording, into an internal data storage (or non-volatile memory), the data that was stored in the buffer within a predetermined time before and after the detection. Such an event may in particular be a traffic collision. A traffic collision may be detected, for example, by the triggering deployment of an irreversible safety device such as an airbag or seat belt preloading device. A traffic collision may also be detected at the occurrence of acceleration/deceleration exceeding a predefined threshold (e.g., a speed change of 8 km/h or higher within about 150 ms). The predefined event(s) may further include a malfunction of the main function of the vehicle.

The EDR 11 may be configured to receive trigger signal (s) informing of the occurrence of an event from the electronic control unit(s), such as, for example, an airbag control unit (ACU). The EDR 11 may be accessible to values measured by at least one or more sensors 13. At least one sensor 13 may be configured to detect vehicle speed/acceleration/deceleration/travel distance/geographical position, and the like. The EDR 11 may be included as a functional module in the airbag control unit (ACU).

The data recorded by the EDR 11 may be data suitable for analyzing traffic collisions, such as, for example, data of vehicle dynamics, a driver's behavior, and an operating state of a vehicle safety system. The EDR 11 may be configured to transmit recorded data (hereinafter referred to as "EDR data" or "event data") to a telecommunication device 15 so as to be transmitted to the cloud storage system 20.

The autonomous driving system 14 may be configured to generate interaction signals indicative of interactions between a driver and the autonomous driving system 14. These interaction signals may include a signal indicating whether one or more autonomous driving functions are currently active. For example, the autonomous driving system 14 may generate a signal indicating whether an adaptive cruise control (ACC) function is currently active. As another example, the autonomous driving system 14 may generate a signal indicating whether driving of a vehicle is currently being controlled fully automatically rather than manually. In addition, these interaction signals may further include signals indicating a transition demand indicating that control of the driving task to a driver needs to be taken over, and signals indicating that control of the driving task to the driver has been taken over. The autonomous driving system 14 may provide interaction signals to the DSSAD 12 via a data bus (for example, CAN bus, Ethernet bus, etc.).

The DSSAD 12 may store interaction data representing interaction between a driver and the autonomous driving system in an internal storage based on the interaction signals received from the autonomous driving system 14 while driving. The DSSAD storage may be a non-volatile memory such as EEPROM or flash memory. The DSSAD 12 is installed on a vehicle equipped with a highly-automated driving system (for example, SAE level 3, 4, 5 classification), and is a data storage system that aims to clarify "subjects requested to drive" and "subjects who actually drove." During the transition procedure (that is, after the transition demand is issued and until a driver actually takes over control), the "subject requested to drive" and the "subject who actually drove" may be different from each other.

Interaction data may include time-stamped data elements representing specific interaction events, such as, for example, changing the state (switched off, activated, transition demand, override) of the autonomous driving system, starting and ending Minimal Risk Maneuver (MRM) by the autonomous driving system, and taking over control of a driving task to a driver. The DSSAD 12 may provide the stored interaction data (hereinafter, may also be referred to as "DSSAD data") to the telecommunication device 15 so as to be transmitted to the cloud storage system 20.

The telecommunication device 15 may be a wired or wireless telecommunication device that connects the vehicle's internal network to an external communication network. The telecommunication device 15 may be, for example, a telematics unit (TMU), or a wired/wireless dongle plugged into an OBD-II port. The telecommunication device 15 may include a wireless transceiver capable of cellular communication such as GSM/WCDMA/LTE/5G or short-range wireless communication such as WLAN, c-V2X, WAVE, DSRC, or Bluetooth, for example.

The telecommunication device 15 may be configured to generate an event report message when EDR data is received from the EDR 11. The telecommunication device 15 may be configured to transmit the event report message to the cloud storage system 20 via the communication network. The event report message may include vehicle identification information (VII) and EDR data received from the EDR 11. In a typical embodiment, the VII may be a vehicle identification number (VIN), which is a 17-digit unique identifier composed of numbers and letters assigned to individual vehicles by vehicle manufacturers. Alternatively, the VII may be a vehicle registration number (or license plate information), a unique identifier used by the telecommunication device 15 for communication, a (long-term or short-term) certificate assigned to a vehicle for V2X communication, and the like. The event report message may further include additional information such as a geographic location, date, and time of occurrence of an event.

The telecommunication device 15 may generate an interaction report message when DSSAD data is received from the DSSAD 12. The telecommunication device 15 may transmit the interaction report message to the cloud storage system 20 via the communication network. The interaction report message may include the vehicle identification information (VII) and the DSSAD data received from the DSSAD 12.

The cloud storage system 20 is a data management system, implemented with servers on a network, that collects and manages EDR data and DSSAD data from a plurality of vehicles.

The cloud storage system 20 may receive an event report message and an interaction report message from a plurality of vehicles. For report messages received from the vehicle, the cloud storage system 20 separates the VII from the EDR/DSSAD data that enables a third party to identify or track the related vehicle or the related individual, so that the VII and the EDR/DSSAD data may be stored in different databases, respectively.

The cloud storage system 20, in response to a request of a user who wants to use the EDR/DSSAD data, may provide anonymized EDR/DSSAD data in which a specific vehicle or individual is not identified, or provide EDR/DSSAD data in which a specific vehicle or individual is identified. The user may be a vehicle owner, a driver, an insurance company, a government agency, a researcher, or a vehicle manufacturer who wants to utilize EDR/DSSAD data. For EDR/DSSAD data in which a specific vehicle or individual has been identified, unless otherwise authorized by a court order, search warrant, and/or other applicable laws and regulations, the cloud storage system 20 needs to be provided only to investigators or other users authorized by the relevant vehicle owner.

A centralized system as illustrated in FIG. 1 that collects and manages DSSAD data from vehicles may free the EDR 11 and the DSSAD 12 from storage space constraints.

Figure 5:
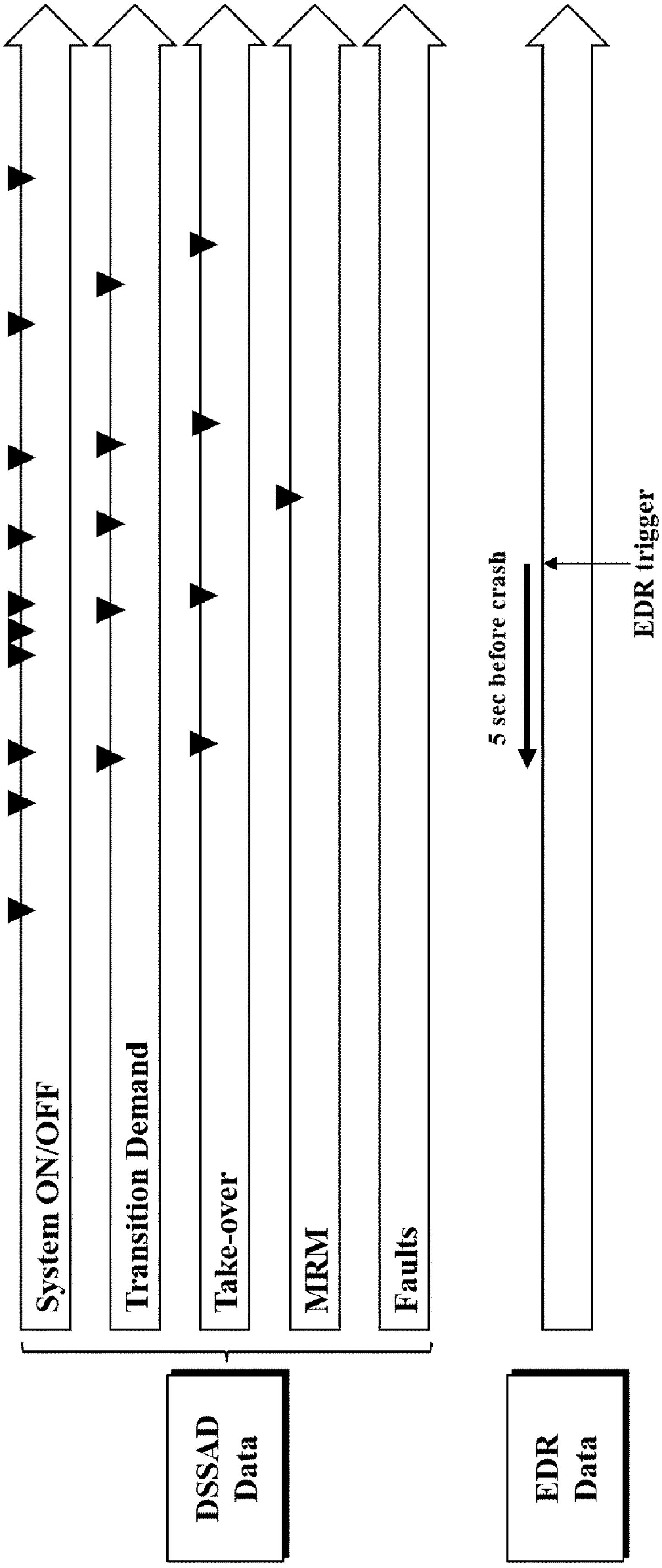
FIG. 5 is a conceptual diagram illustrating a difference between event data and interaction data that may be recorded in a vehicle.

As illustrated in FIG. 5, the EDR 11 records or stores event-related data when an event such as a collision accident occurs, whereas the DSSAD 12 records or stores the interactions between a vehicle and a driver while driving. It is noted that the volume of data to be recorded or stored by the DSSAD 12 is very large compared to the EDR 11. In addition, the upload of EDR/DSSAD data to the cloud storage system may fail for a considerable period of time due to various reasons such as a problem in the function of a telecommunication device of the vehicle, expiration of a telecommunication service subscription, or connection failure due to traffic congestion. As a result, the space of an internal storage of the DSSAD 12 may be full. When the space of the internal storage is full, the DSSAD 12 may be configured to overwrite the internal storage with a first-in first-out (FIFO) loop. Accordingly, there may still be a high risk that the past interaction data stored in the internal storage of the DSSAD 12 will be overwritten with new interaction data without being uploaded to the cloud storage system 20.

The present inventors note that EDR data and DSSAD data are used complementary to each other in forensic investigations, and in particular, DSSAD data is useful for identifying a subject that was controlling a vehicle at the time of a collision accident. Accordingly, among the series of interaction data recorded and stored by the DSSAD 12 while driving, the interaction data recorded proximate to a point in time of a collision may be very important in the forensic investigations.

Some techniques of embodiments of the present disclosure are intended to prevent the interaction data recorded proximate to a point in time of a collision from being overwritten with new interaction data without being uploaded to the cloud storage system. In addition, some techniques of embodiments of the present disclosure are intended to enable the interaction data recorded proximate to a point in time of a collision to be uploaded to the cloud storage system as successfully as possible.

As will be described in detail below, according to the techniques of embodiments of the present disclosure, the interaction data recorded proximate to a point in time of a collision is protected from overwriting or periodic data deletion due to an insufficient space of an internal storage, and is uploaded to the cloud storage system in preference to other interaction data.

Figure 2:
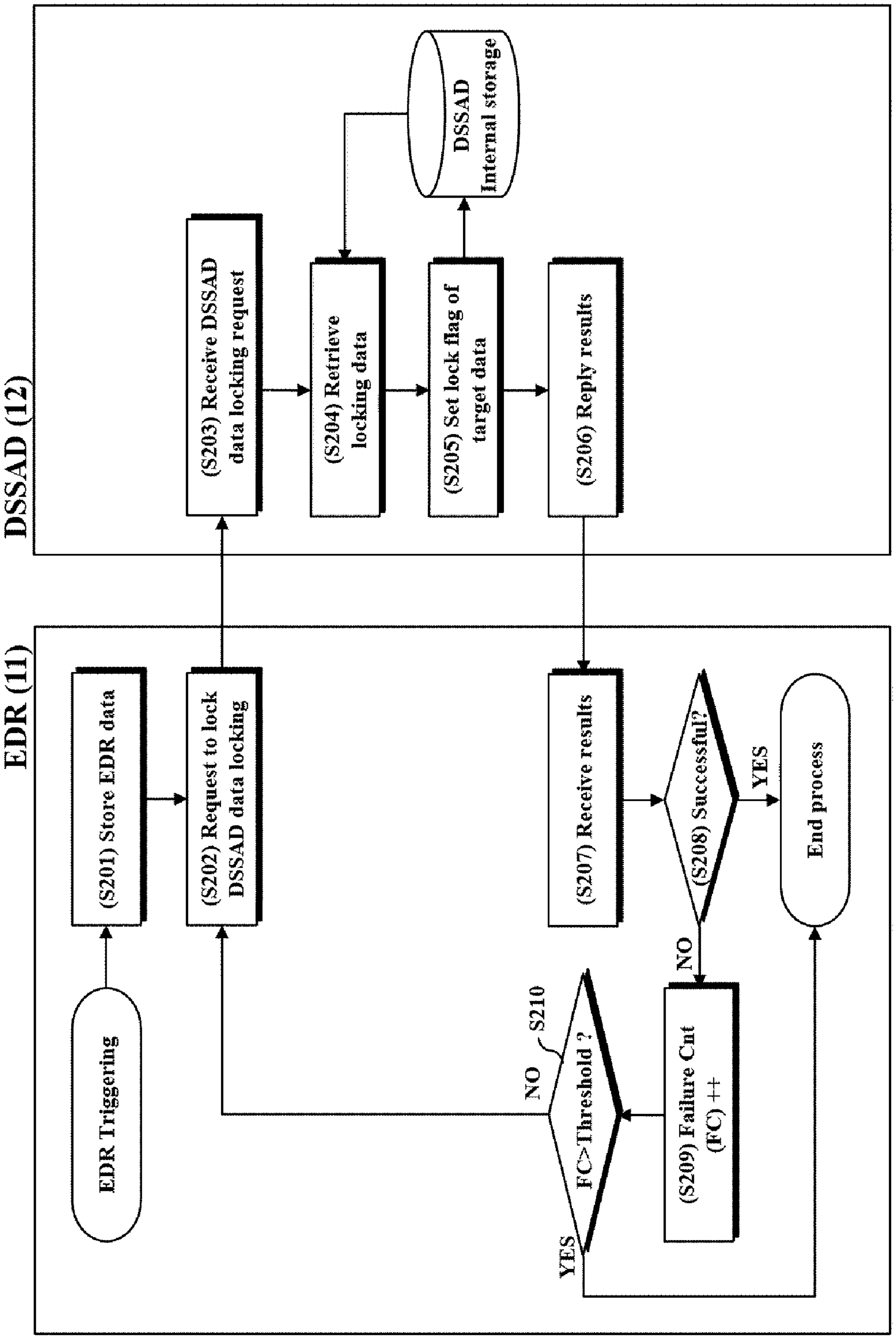
FIG. 2 is a flowchart illustrating a method of setting a lock on interaction data recorded proximate to a point in time of the occurrence of an event that triggers EDR of a vehicle to record according to an embodiment of the present disclosure.

FIG. 2 is a flowchart illustrating a method of setting a lock on interaction data recorded proximate to a point in time of the occurrence of an event that triggers EDR of a vehicle to record according to an embodiment of the present disclosure.

The EDR 11 may receive trigger signal(s) informing the occurrence of an event from an electronic control unit(s), such as an airbag control unit (ACU). The EDR 11 may detect the occurrence of an event based on values measured by at least one sensor included in the sensor system 13. At least one sensor may be designed to sense the speed/acceleration/deceleration/travel distance/geographical location of a vehicle.

When the EDR 11 detects the occurrence of at least one predefined event or receives a trigger signal informing the occurrence of the event, the event data recorded in a buffer (or a volatile memory) within a predetermined time before and after the occurrence of the event may be stored in an internal storage (or a non-volatile memory) (S201), and a lock that prohibits overwriting of the stored event data may be set. Rule information defining a trigger condition, data items to be stored in response to a trigger signal, and a data lock condition may be stored in the internal storage or other non-volatile memories of the EDR 11.

The EDR 11 may transmit a locking request signal requesting to set a lock on the interaction data recorded proximate to a point in time of occurrence of an event to the DSSAD 12 (S202).

Upon receiving the locking request signal (S203), the DSSAD 12 may retrieve target interaction data from the internal storage according to a predefined rule (S204), and assign a second value (e.g., "1") to a lock flag of the target interaction data (S205). The DSSAD 12 may specify the target interaction data based on a point in time when the locking request signal is received. For example, the target interaction data may be recent interaction data stored for a certain period before a point in time when the locking request signal is received. Alternatively, the target interaction data may be a predefined number of recent interaction data stored before a point in time when the locking request signal is received.

Rule information defining a method for specifying the target interaction data to be locked, a locking data range, a locking data format, etc. may be stored in the internal storage or other non-volatile memories of the DSSAD 12. The rule information stored in the EDR 11 and the rule information stored in the DSSAD 12 are different from each other and may be managed independently.

The DSSAD 12 may transmit a response to the EDR 11 to inform the locking execution result (S206). The response received from the DSSAD 12 (S207) may indicate whether the locking execution has been successful. Based on the response received from the DSSAD 12, the EDR 11 may determine whether locking has been successfully performed (S208). Due to a network error or a fault in the DSSAD 12, the DSSAD 12 may not receive the locking request signal from the EDR 11 or the EDR 11 may not receive the response from the DSSAD 12, and then the EDR 11 may determine the same as a locking failure. The EDR 11 may increase a failure count (FC) by 1 when locking fails (S209), and may transmit a locking request signal to the cloud storage system again (S202). When the FC exceeds a threshold value (YES in S210), the EDR 11 may provide an alarm to a driver and terminate the locking procedure.

Figure 3:
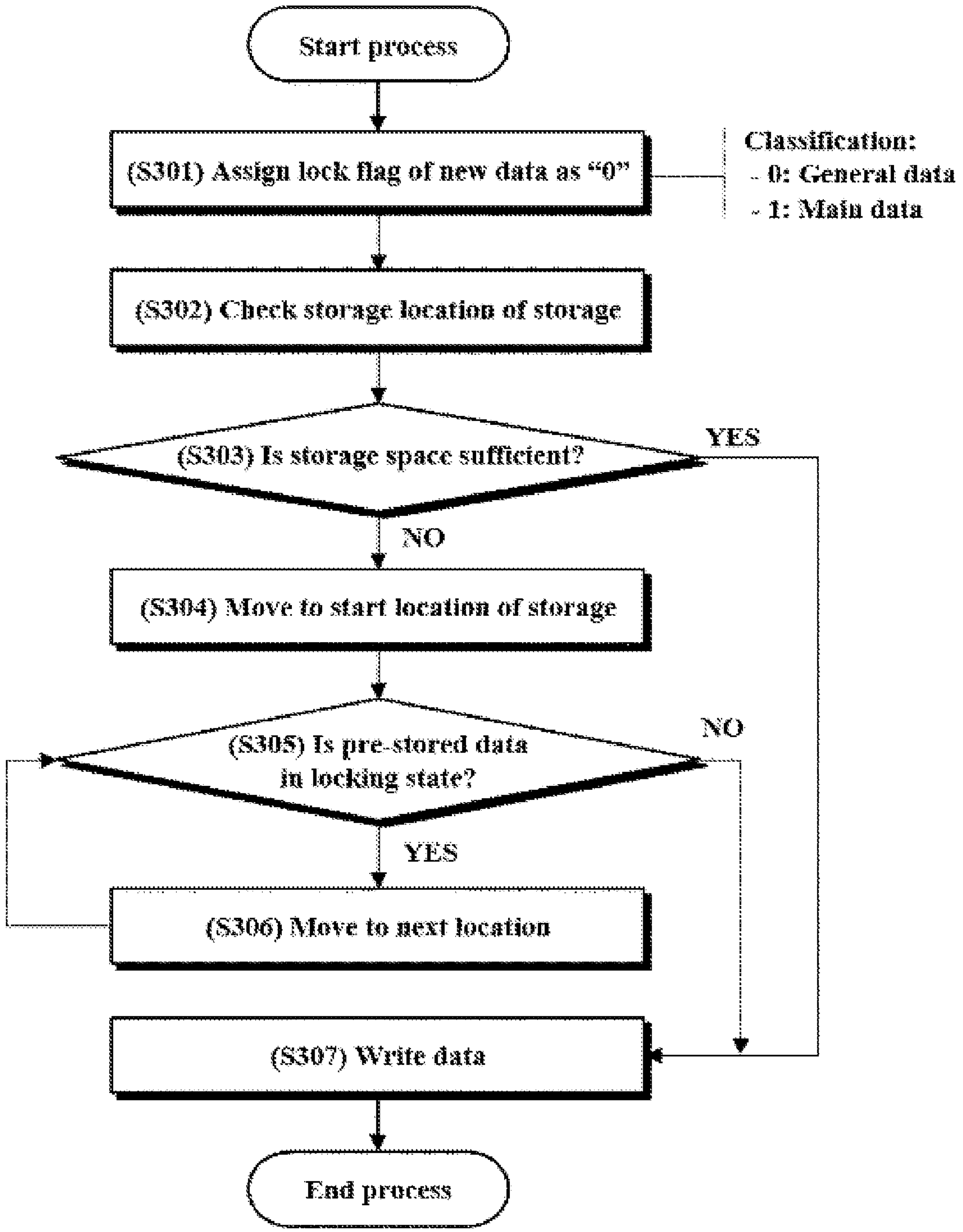
FIG. 3 is a flowchart illustrating a method for a vehicle to store new interaction data according to an embodiment of the present disclosure.

FIG. 3 is a flowchart illustrating a method for a vehicle to store new interaction data according to an embodiment of the present disclosure.

When the DSSAD 12 receives a new interaction signal from an autonomous driving system, it may generate new interaction data to be stored in the internal storage.

The interaction data may have at least three fields including a lock flag, a timestamp, and a type flag. The lock flag is a flag indicating lock settings of the interaction data. The timestamp represents the time at which a certain interaction between a driver and a system occurs. The type flag is a flag indicating the type of interaction between the driver and the system, such as a transition request or a minimum risk maneuver.

When storing new interaction data in the internal storage, the DSSAD 12 may assign a first value (e.g., "o") to the lock flag of the new interaction data (S301). As described above, in response to receiving the locking request signal from the EDR 11, the lock flag of the interaction data that meets the locking condition will be changed to a second value (e.g., "1").

The DSSAD 12 may check whether an empty storage space of the internal storage is sufficient to store new interaction data (S302 to S303). When the empty storage space is sufficient (YES in S303), the DSSAD 12 may store the new interaction data in the empty storage space (S307).

When there is not enough empty storage space (NO in S303), the internal storage is overwritten with the FIFO loop, but the locked interaction data needs to be protected from being overwritten. The DSSAD 12 may move to a start storage location of the internal storage (S304), and based on the value of the lock flag of the pre-stored interaction data, the DSSAD 12 may determine whether the pre-stored interaction data is in a locking state (S305).

When the lock flag of the pre-stored interaction data has a first value (i.e., "o") (NO in S305), the DSSAD 12 overwrites the pre-stored interaction data with new interaction data (S307).

When the lock flag of the pre-stored interaction data has a second value (i.e., "1") (YES in S305), the DSSAD 12 does not overwrite the same with new interaction data and moves to the next storage location to find the interaction data that is not in a locking state (S306).

The DSSAD 12 may be configured to delete old interaction data when the percentage of empty storage space in the internal storage reaches a predefined threshold percentage (e.g., 90%). The DSSAD 12 may also be configured to periodically delete old interaction data to maintain a certain level of the remaining storage space of the internal storage. By maintaining a certain level of the remaining storage space of the internal storage, the DSSAD 12 may efficiently cope with a situation in which a large amount of interaction data needs to be suddenly recorded. In addition, compared to the method of overwriting with the FIFO loop, a method of pre-deleting such old interaction data may be advantageous in terms of data recovery. The interaction data in a locking state needs to be protected from such (periodic) deletion task.

Figure 4:
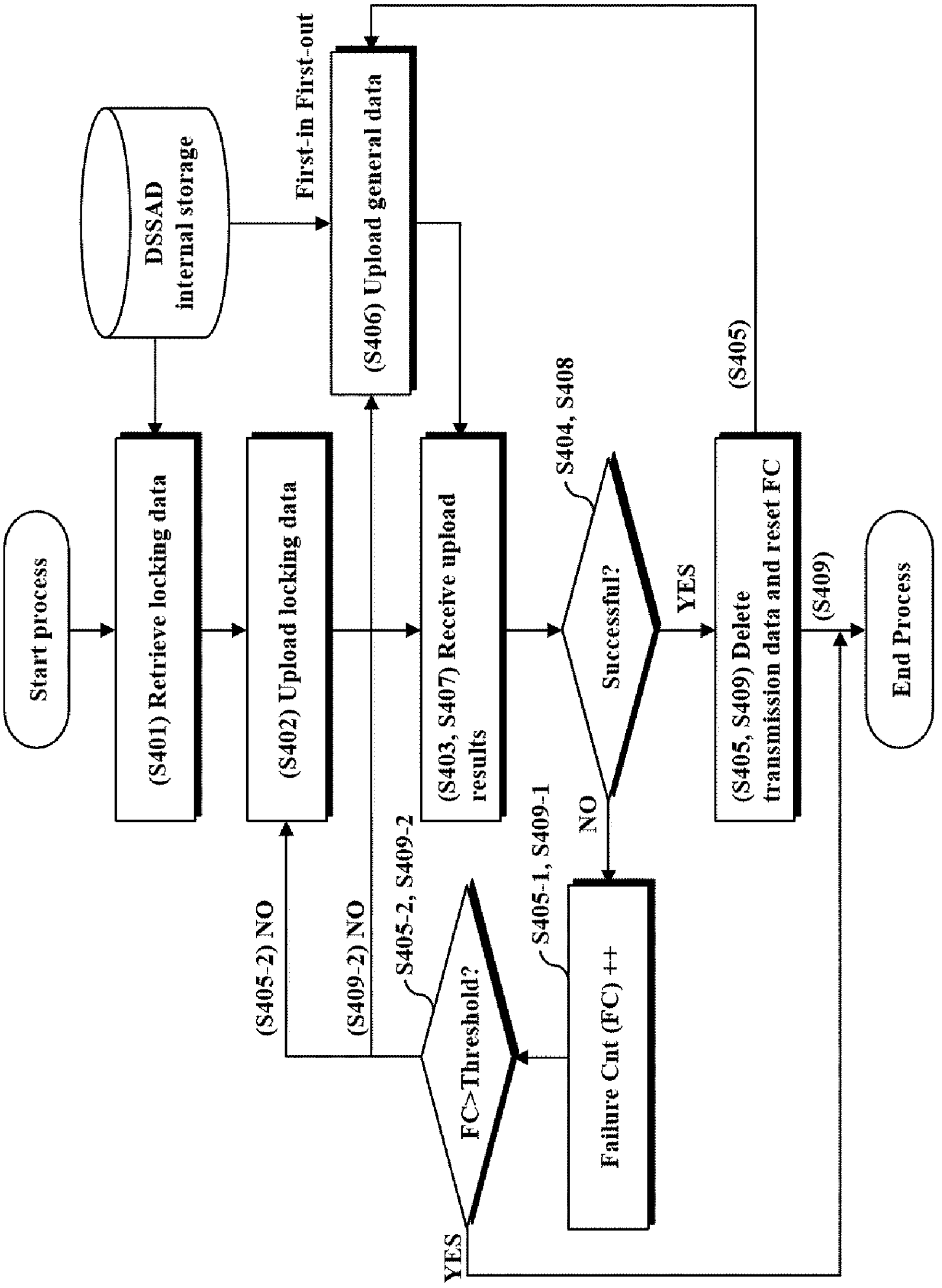
FIG. 4 is a flowchart illustrating a method for a vehicle to transmit interaction data to a cloud storage system according to an embodiment of the present disclosure.

FIG. 4 is a flowchart illustrating a method for a vehicle to transmit interaction data to the cloud storage system 20 according to an embodiment of the present disclosure. According to the present embodiment, data in a locking state (i.e., main data) is transmitted before data not in the locking state (i.e., general data).

When a upload procedure is initiated, the DSSAD 12 retrieves, from the internal storage, the interaction data in which the lock flag is set to a second value (i.e., "1") (S401), and provides the locked data to the telecommunication device 15 so that the found locked data may be uploaded to the cloud storage system 20 (S402). Based on the upload result received to the cloud storage system 20, the DSSAD 12 may determine whether the transmission of the locked data has been successfully completed (S403 to S404). When the upload is successful, the DSSAD 12 may delete the transmitted locked data from the internal storage (S405).

When the transmission of the locked interaction data is successfully completed, the DSSAD 12 may provide the unlocked interaction data (i.e., general data) to the telecommunication device 15 so that it can upload the unlocked interaction data to the cloud storage system 20 (S406). When the upload is successful, the DSSAD 12 may delete the transmitted unlocked interaction data from the internal storage (S407 to S408).

The upload of the interaction data may fail due to a network problem. The DSSAD 12 may increase the FC by "1" when it fails to upload (S405-1 and S409-1), and may retry uploading the interaction data to the cloud storage system 20 (S402 and S406). When the FC exceeds a threshold value (YES in S405-2 and S409-2), the DSSAD 12 may provide an alarm to a driver and terminate the upload procedure of the interaction data.

In some embodiments, the DSSAD 12 may be configured to perform an upload procedure that transmits the interaction data to the cloud storage system 20 when the percentage of empty storage space in the internal storage of the DSSAD 12 reaches a threshold value.

In some other embodiments, the DSSAD 12 may be configured to periodically upload interaction data to the cloud storage system 20. For example, the DSSAD 12 may be scheduled to perform an upload procedure of the interaction data every 6 hours or 12 hours, or every day or every week. When the ignition of a vehicle enters an ON state, the DSSAD 12 may determine whether an upload period has elapsed from a point in time of the last upload. When it is determined that the upload period has elapsed, the DSSAD 12 may initiate an upload procedure.

In some other embodiments, the DSSAD 12 may be configured to initiate an upload procedure for transmitting interaction data to the cloud storage system 20 whenever the ignition of the vehicle enters an ON state.

Accordingly, in these embodiments, when the ignition of a vehicle is turned on, the DSSAD 12 may perform an upload procedure for transmitting the interaction data to the cloud storage system 20. In such a case, the ignition of a plurality of vehicles may enter an ON state for a short period of time during the morning/evening rush hour, and thus the upload attempt to the cloud storage system 20 may be concentrated.

In order to distribute an upload attempt, the DSSAD 12 may be configured to hold the execution of an upload procedure from a point in time when the ignition of a vehicle enters an ON state until the waiting time calculated based on random numbers elapses. In other words, the DSSAD 12 may be configured to initiate the upload procedure after the waiting time has elapsed from a point in time when the ignition of the vehicle enters the ON state. The waiting time may be, for example, a remainder obtained by dividing a predefined maximum waiting time (e.g., 30 minutes) by a random number.

It should be understood that the illustrative embodiments described above may be implemented in many different ways. In some embodiments, the various methods, devices, servers, (sub) system(s) described in this disclosure may be implemented by at least one general purpose computer having processors, memories, disks or other mass storage, communication interfaces, input/output (I/O) devices and other peripheral devices. The general purpose computer may serve as an apparatus, server, or system adapted to load software instructions on the processor, and then execute the instructions to perform the functions described in this disclosure, and thereby perform the methods described above.

The various methods described in this disclosure may be implemented with instructions stored on a non-transitory recording medium, which can be read and executed by one or more processors. Non-transitory recording media includes, for example, all types of recording device in which data is stored in a form readable by a computer system. For example, non-transitory recording media include storage media such as erasable programmable read-only memory (EPROM), electrically erasable programmable read-only memory (EEPROM), flash drives, optical drives, magnetic hard drives, and solid state drives (SSDs).

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A vehicle system, the system comprising:

a telecommunication device that enables communication between a vehicle and a remote server;

a first data recorder configured to store, in a first internal storage, a plurality of interaction data indicating time-stamped interactions that occur between an autonomous driving system of the vehicle and a driver while driving and configured to protect main interaction data of the plurality of interaction data that is stored proximate to a point in time of an occurrence of a predefined event from being overwritten with new interaction data without first being uploaded to the remote server; and a second data recorder configured to store, in a second internal storage, event data indicating a state of the vehicle for a predetermined time before and after the event occurs.

2. The system of claim 1, wherein, when the new interaction data is stored in the first internal storage, the first data recorder is configured to set a lock flag of the new interaction data as a first value and change the lock flag of the main interaction data to a second value.

3. The system of claim 2, wherein the second data recorder is configured to transmit a locking request signal to the first data recorder in response to the occurrence of the event, so that the first data recorder is able to specify the main interaction data among the plurality of interaction data.

4. The system of claim 3, wherein the first data recorder is configured to change a lock flag of recent interaction data stored for a predetermined period before a point in time when the locking request signal is received to a second value in response to the locking request signal.

5. The system of claim 3, wherein the first data recorder is configured to change the lock flag of a predefined number of recent interaction data stored before a point in time when the locking request signal is received to a second value in response to the locking request signal.

6. A vehicle system, the system comprising:

a telecommunication device;

a first data recorder configured to:

store, in a first internal storage, a plurality of interaction data indicating timestamped interactions that occur between an autonomous driving system of the vehicle and a driver while driving;

protect main interaction data of the plurality of interaction data that is stored proximate to a point in time of an occurrence of a predefined event from being overwritten with new interaction data without first being uploaded to a remote server; and provide the plurality of interaction data stored in the first internal storage to the telecommunication device so the telecommunication device can upload the plurality of interaction data to the remote server; and a second data recorder configured to:

store, in a second internal storage, event data indicating a state of the vehicle for a predetermined time before and after the event occurs; and provide the event data stored in the second internal storage to the telecommunication device so that the telecommunication device can upload the event data to the remote server.

7. The system of claim 6, wherein the first data recorder is configured to delete related interaction data from the first internal storage when an upload to the remote server is successful.

8. The system of claim 6, wherein the first data recorder is configured to upload the main interaction data to the remote server preferentially among the plurality of interaction data stored in the first internal storage.

9. The system of claim 6, wherein the first data recorder is configured to provide the plurality of interaction data stored in the first internal storage to the telecommunication device whenever an ignition of the vehicle enters an ON state.

10. The system of claim 6, wherein the first data recorder is configured to provide the plurality of interaction data stored in the first internal storage to the telecommunication device after a waiting time calculated based on a random number elapses from a point in time when an ignition of the vehicle enters an ON state.

11. A method performed by a vehicle system, the method comprising:

storing, by a first data recorder, in a first internal storage, a plurality of interaction data indicating timestamped interactions that occur between an autonomous driving system of a vehicle and a driver while driving;

storing, by a second data recorder, in a second internal storage, event data indicating a state of the vehicle for a predetermined time before and after a predefined event occurs;

identifying, by the first data recorder, main interaction data of the plurality of interaction data stored proximate to a point in time of an occurrence of the event; and changing, by the first data recorder, a value of a lock flag of the main interaction data to protect the main interaction data from being overwritten with new interaction data without first being uploaded to a remote server.

12. The method of claim 11, further comprising:

when storing the new interaction data in the first internal storage, setting a lock flag of the new interaction data as a first value; and changing the lock flag of the main interaction data to a second value.

13. The method of claim 12, further comprising transmitting, by the second data recorder, a locking request signal to the first data recorder in response to the occurrence of the event, so that the first data recorder is able to specify the main interaction data among the plurality of interaction data.

14. The method of claim 13, further comprising changing, by the first data recorder, a lock flag of recent interaction data stored for a predetermined period before a point in time when the locking request signal is received to a second value in response to the locking request signal.

15. The method of claim 13, further comprising changing, by the first data recorder, the lock flag of a predefined number of recent interaction data stored before a point in time when the locking request signal is received to a second value in response to the locking request signal.

16. The method of claim 11, further comprising uploading the plurality of interaction data stored in the first internal storage and the event data stored in the second internal storage to the remote server.

17. The method of claim 16, further comprising deleting related interaction data from the first internal storage when an upload to the remote server is successful.

18. The method of claim 16, wherein, among the plurality of interaction data stored in the first internal storage, the main interaction data is preferentially uploaded to the remote server.

19. The method of claim 16, wherein, whenever an ignition of the vehicle enters an ON state, the plurality of interaction data stored in the first internal storage is uploaded to the remote server.

20. The method of claim 16, wherein, after a waiting time calculated based on a random number elapses from a point in time when an ignition of the vehicle enters an ON state, the plurality of interaction data stored in the first internal storage is uploaded to the remote server.

* * * * *